Figure 1:
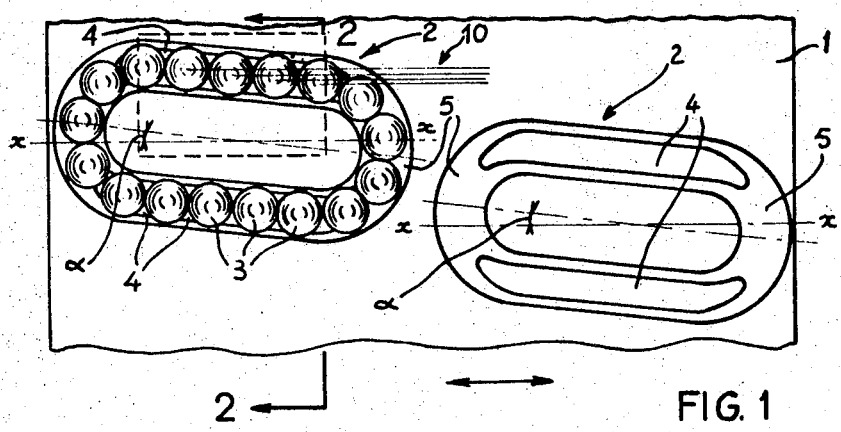

United States Patent

[11] 3,582,160

| [72] | Inventor | Charles Henri Schutz |
| | | 51, Rue Nicolas Garner, Villeurbanne (Rhone), France |
| [21] | Appl. No. | 837,538 |
| [22] | Filed | June 30, 1969 |
| [45] | Patented | June 1, 1971 |
| [32] | Priority | June 28, 1968 |
| [33] | | France |
| [31] | | 1,582,155 |

[54] BALL BEARINGS FOR LONGITUDINAL AND TURNING MOVEMENTS, COMPRISING GUIDES OR CIRCUITS OF BALLS IN CLOSED CIRCUITS
5 Claims, 2 Drawing Figs.

| [52] | U.S. Cl. | 308/6 |
| [51] | Int. Cl. | F16c 29/06 |
| [50] | Field of Search | 308/6 |

[56] References Cited
UNITED STATES PATENTS

| 2,520,785 | 8/1950 | Schlicksupp | 308/6 |
| 3,037,821 | 6/1962 | Schutz | 308/6 |
| 3,043,634 | 7/1962 | Cooley | 308/6 |

*Primary Examiner*—Martin P. Schwadron
*Assistant Examiner*—Frank Susko
*Attorney*—Waters, Roditi, Schwartz & Nissen

ABSTRACT: A ball bearing assembly for longitudinal and rotational movements has a cage with ball guides having open parts inclined with respect to the generatrices of the cage. This helicoidal inclination enables each ball as it resists the load to travel over a constantly laterally displacing line even where only a longitudinal motion is imposed on the bearing. The angle of inclination is about 3°.

BALL BEARINGS FOR LONGITUDINAL AND TURNING MOVEMENTS, COMPRISING GUIDES OR CIRCUITS OF BALLS IN CLOSED CIRCUITS

The present invention relates to improvements in ball bearings for longitudinal and rotational movements, comprising guides or circuits of balls in closed circuits. More particularly, the invention relates to ball bearings, for longitudinal and/or rotational movements, those such as disclosed in U.S. Pat. No. 3,037,821 June 5, 1962, which comprise a cage for the guiding of balls in closed circuits, each of these circuits being composed of two rectilinear parts opening on both sides of the cage and through one of which the contact of the balls supporting the load is established with two members, such as a ring and a shaft, between which the bearing is placed.

In this type of bearing, due to the fact that the open parts of the ball guides are rectilinear and that they are oriented along generatrices of the cage, these balls, when the movement is only longitudinal pass one after the other, theoretically, over the same contact and load points on the outer ring and on the inner pillar.

The wear created by the passage of the balls supporting the load along a constant line is obviously greater as the load is greater.

This wear, even very slight, is abnormal if it is considered that there remains a multitude of contact points which are usable and which could considerably prolong the service life of the bearing or enable greater loads to be acceptable.

Every new rectilinear contact line would permit in fact a new service life for use in longitudinal movement.

It is an object of the present invention to overcome this drawback by constraining the cage to turn on itself with respect to its two support members (ring and shaft) included here in the case where only a longitudinal movement is imposed on the bearing.

It consists, to this end, in inclining with respect to the generatrices of the cage, the opened parts of each guide or circuit of balls of the said cage, so that this inclination, which is thus helicoidal, gives to each of the balls at the moment when it supports the load, a rectilinear direction along a line which is constantly displaced.

Thus, while rolling in a rectilinear direction through helicoidal openings of the cage, the balls constrain this cage to turn with a rotary movement with respect to the outer ring and to the inner shaft.

This rotary movement of the cage, caused by a longitudinal movement of one or of the other of the said two members (outer ring or inner shaft) has the effect of placing on new contact and load lines, new balls, which enter the open parts of the ball circuits or guides.

The contacts under load thus necessarily act on other points of the outer ring and of the inner shaft progressively as the longitudinal movement of one of these two members occurs and is increased.

This improvement thus permits the imposition of heavier loads and increases the service life of the bearing in the case of its use for longitudinal motion alone.

A better distribution of loads on each ball of the same guide circuit is also obtained, the result having the effect of further improving the efficiency of the bearing.

This improvement also has the effect of making the bearing more silent in the case of its use for rotational movement, whether or not accompanied by longitudinal movement, due to the fact that the balls are displaced along the circumference and axially with respect to one another in the open helicoidal parts of the cage, these balls thus staggered entering and leaving one after the other contact surfaces existing on the inner periphery of the outer ring.

Figure 2:
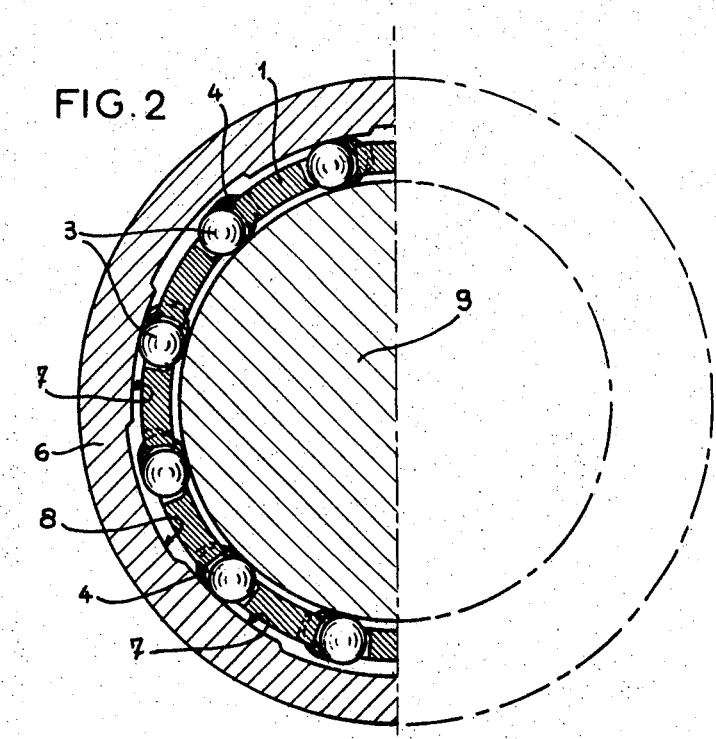

In order that the invention may be more fully understood one embodiment of a ball bearing according to the invention is described below purely by way of illustrative but nonlimiting example with reference to the accompanying diagrammatic drawing in which:

FIG. 1 shows the partial development of a cage comprising two arrays of guides or circuits, only one of these guides being, for better understanding, furnished with balls and FIG. 2 is a transverse section taken along line 2-2 of FIG. 1 of a bearing equipped with such a cage.

In the drawing, 1 denotes a cage having guides or circuits 2 for the balls 3, these guides or circuits being closed and each comprising two rectilinear parts 4, parallel, with one another, and opening on two faces, with closed connecting ramps 5 situated at the two ends; 6 denotes an outer ring with contact bearing surfaces 7, separated from one another by recessed parts or gaps 8; and 9 denotes the inner shaft shaft member.

As shown in the drawing, the two open parts 4 of each guide or circuit 2 have a helicoidal angle of inclination $\alpha$ of the order of about 3° the cage 1, which makes the cage turn when the bearing is displaced in the direction of the arrow, the balls which enter into the open parts 4 of the guides or circuits 2 being placed on new contact and load lines 10.

In FIG. 1, the rectangle bounded by axial dashes represents diagrammatically one of the contact surfaces 7 of the outer ring 6.

As goes without saying and as emerges besides already from that which precedes, the invention is not limited in any way to the single embodiment described above; it embraces, on the contrary, any variation of realization, whatever the value of the angle $\alpha$ which must however be slight as well as the number of arrays of guides or circuits of balls and the number of these guides or circuits of balls in each array, the cage and the ring being of any length, as well as the diameters. Various changes and modifications may thus be made in the embodiment described without departing from the essential concept of the invention as defined in scope by the appended claims.

I claim:

1. An improvement in a ball bearing mounted between an external ring and an internal shaft wherein the ring and shaft are adapted for relative unlimited longitudinal and/or rotational movement, the ball bearing comprising a freely rotatable ball cage interposed between the ring and shaft and with said ball cage defining closed circuits ball races in which balls circulate and rotate upon relative movement between the ring and shaft, said ball races each comprising two rectilinear parallel portions in side-by-side relationship, said portions being open ended and extending into closed arcuate end portions so as to define said closed circuits, the inner periphery of said ring having raised portions to ensure load-carrying contact with the balls within the open portions of the cage, and recessed portions for the unloaded return movement of said balls, wherein said improvement comprises in that said open-ended ball race portions are inclined relative to the axial generatrices of said cage such that said portions have a helicoidal formation and impart to the balls, during relative rectilinear movement of said ring and shaft, a direction of rectilinear motion parallel to one another but angularly offset, causing the cage to constantly rotate relative to said ring or shaft, the rotation of said cage being in response to the directional change of movement of the balls upon entering the opened portions of said ball races and contacting the raised portions of the inner periphery of said ring, and said raised portions forming the load-bearing surfaces whereby, during the relative rotational movement of said ring or of said shaft, the angularly offset balls successively contact the raised portions of the miner periphery of said ring.

2. An improvement as claimed in claim 1, wherein the angle of inclination of said portions is about 3°.

3. An improvement as claimed in claim 1, wherein said open-ended portions are circumferentially spaced and parallel to one another.

4. An improvement as claimed in claim 3, wherein the other of said portions is a recirculation portion and the balls are out of contact with at least one of the ring and shaft in said other portion.

5. An improvement as claimed in claim 1, wherein said rotation of the cage, even when caused by relative rectilinear movement of said external ring and said shaft causes the balls to enter in sequence but angularly offset from each other, into said one portion either in the axial or circumferential direction or both directions at the same time, depending on the amplitude of movement.